United States Patent
Guerra et al.

(10) Patent No.: US 10,235,354 B2
(45) Date of Patent: Mar. 19, 2019

(54) CONTEXT SENSITIVE USER DICTIONARY UTILIZATION IN TEXT INPUT FIELD SPELL CHECKING

(71) Applicant: SugarCRM Inc., Cupertino, CA (US)

(72) Inventors: Filipe Guerra, San Jose, CA (US); Vladyslav Kulchytskyy, Nashua, NH (US)

(73) Assignee: SugarCRM Inc., Cupertino, CA (US)

( * ) Notice: Subject to any disclaimer, the term of this patent is extended or adjusted under 35 U.S.C. 154(b) by 310 days.

(21) Appl. No.: 14/881,107

(22) Filed: Oct. 12, 2015

(65) Prior Publication Data

US 2017/0103057 A1    Apr. 13, 2017

(51) Int. Cl.
   *G06F 17/20* (2006.01)
   *G06F 17/27* (2006.01)

(52) U.S. Cl.
   CPC ........ *G06F 17/273* (2013.01); *G06F 17/2735* (2013.01)

(58) Field of Classification Search
   CPC .................................................... G06F 17/273
   See application file for complete search history.

(56) References Cited

U.S. PATENT DOCUMENTS

| 5,261,112 A | * | 11/1993 | Futatsugi | G06F 17/273 |
| | | | | 715/246 |
| 2003/0038735 A1 | * | 2/2003 | Blumberg | C09C 1/3684 |
| | | | | 341/22 |
| 2004/0039988 A1 | * | 2/2004 | Lee | G06F 17/276 |
| | | | | 715/226 |
| 2014/0035823 A1 | * | 2/2014 | Khoe | G06F 3/02 |
| | | | | 345/171 |

* cited by examiner

*Primary Examiner* — Stephen S Hong
*Assistant Examiner* — Shahid K Khan
(74) *Attorney, Agent, or Firm* — Steven M. Greenberg, Esq.; Shutts & Bowen LLP

(57) ABSTRACT

A method for context sensitive user dictionary utilization in text input field spell checking includes associating different text input fields of a user interface of a computer program with either default spell checking or user dictionary utilized spell checking. The method thereafter includes executing the computer program in memory of a computer and receiving text input during the execution of the computer program in one of the different text input fields. It is then determined whether the one of the different text input fields is associated in the memory with default spell checking or user dictionary utilized spell checking. Finally, in response to a determination that the one of the different text input fields is associated in the memory with default spell checking, spell checking is performed using only a main dictionary, but otherwise spell checking is performed using both the main dictionary and also a user dictionary.

18 Claims, 1 Drawing Sheet

CONTEXT SENSITIVE USER DICTIONARY UTILIZATION IN TEXT INPUT FIELD SPELL CHECKING

BACKGROUND OF THE INVENTION

Field of the Invention

The present invention relates to computerized spell checking in a document and more particularly to user dictionary utilization in text input field spell checking of a form.

Description of the Related Art

In computing, a spell checker is a computer program or a module of a computer program that detects words in a document or in a field of a form that may not be spelled correctly. A spell checker customarily includes both a set of logical routines for scanning text and extracting words (parsing), and for comparing the parsed words against a known list of correctly spelled words—namely a dictionary. Depending upon the computer program supported by the spell checker, the dictionary can be limited to a discrete set of application specific words, or the dictionary can be an exhaustive representation of the words of a language. Advanced forms of the spell check even can provide for hyphenation points, lexical and grammatical attributes and in some cases, synonym and antonyms to the words.

Most spell checkers additionally provide for user modification to the dictionary or user supplementation of the dictionary with a user dictionary to account for words known to the user to be spelled correctly though indicated otherwise in the spell checker dictionary. Such is known as a user dictionary. When a spell checker utilizes both a main dictionary and also a user dictionary, each word in a document is used as input to the main dictionary and failing a match the same word in the document is used as input to the user dictionary. In this way, words that are known to be spelled correctly to the end user may be added to the main dictionary so as to provide for spell checking of documents with words uniquely spelled, but validly spelled from the perspective of the end user.

Spell checking is not limited to documents produced in a word processor. Rather, spell checking has found widespread application to many other types of documents including e-mail messages, spreadsheets, drawings and even text input fields of other computer programs. In respect to text input fields, generally spell checking is limited to words found in a single, main dictionary. There is no utilization of a user dictionary in spell checking fields of a forms based application. Even still, for many applications, text input includes words known to be spelled correctly to the end user, but missing from a main dictionary. Examples include addressing information and name information. Depending upon the text field and the particular form in which the text field is presented, requiring strict adherence in spell checking to particular spelling of a word in the main dictionary may or may not be appropriate depending upon the context of the word spelled as presented in the text input field.

BRIEF SUMMARY OF THE INVENTION

Embodiments of the present invention address deficiencies of the art in respect to spell checking text input in a text input field and provide a novel and non-obvious method, system and computer program product for context sensitive user dictionary utilization in text input field spell checking. In an embodiment of the invention, a method for context sensitive user dictionary utilization in text input field spell checking includes associating in memory of a computer different text input fields of a user interface of a computer program with either default spell checking or user dictionary utilized spell checking. The method thereafter includes executing the computer program in the memory of the computer and receiving text input during the execution of the computer program in one of the different text input fields. It is then determined whether the one of the different text input fields is associated in the memory with default spell checking or user dictionary utilized spell checking. Finally, in response to a determination that the one of the different text input fields is associated in the memory with default spell checking, spell checking is performed using only a main dictionary, but otherwise spell checking is performed using both the main dictionary and also a user dictionary.

In one aspect of the embodiment, the user dictionary includes words present in a database of previously presented input by one or more end users in one or more of the different text input fields of the user interface. In another aspect of the embodiment, the user dictionary includes words present in a database of static text presented in the user interface. In yet another aspect of the embodiment, the spell checking of the received text input, when the one of the different text input fields is associated in the memory with default spell checking, compares the received text to words in the main dictionary, fails to locate an identically spelled word in the main dictionary, and marks the received text input in the one of the different text input fields as a misspelled word.

In even yet another aspect of the embodiment, the spell checking of the received text input, when the one of the different text input fields is associated in the memory with user dictionary utilized spell checking, not only compares the received text input to words in the main dictionary and determines that the received text input is correctly spelled based upon the main dictionary, but also compares the received text input to a similarly spelled but different word in the user dictionary, and in response displays a recommended change in spelling of the received text input to the similarly spelled but different word in the user dictionary. Finally, the method may also include additionally associating the one of the different text input fields with a template comprising correlated pairs of text input and suggested changes in spelling of the text input, and in response to the receipt of text input in the one of the different text input fields, determining whether or not the text input is present in the template and if the text input is present in the template, displaying in the user interface the suggested changes in spelling of the text input as specified by the template.

In another embodiment of the invention, a data processing system is configured for context sensitive user dictionary utilization in text input field spell checking. The system includes a host computing system that has one or more computers each with memory and at least one processor. The system also includes a computer program executing in the memory of the host computing system and presenting a user interface of different text input fields. Finally, the system includes a spell checker module coupled to the computer program. The module includes program code enabled to create an association between each of the different text input fields and either default spell checking or user dictionary utilized spell checking, to receive text input during the execution of the computer program in one of the different text input fields, to determine whether the one of the different text input fields is associated in the memory with default spell checking or user dictionary utilized spell checking and to respond to a determination that the one of the different text input fields is associated in the memory with default spell checking, by performing spell checking using only a main dictionary, but otherwise by performing spell checking using both the main dictionary and also a user dictionary.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for context sensitive user dictionary utilization in text input field spell checking. In accordance with an embodiment of the invention, different text input fields of a user interface are separately associated either with default spell checking or user dictionary utilized spell checking. Thereafter, text input is received in one or more of the text input fields in the user interface of the computer program. The text input in each text input field is spell checked utilizing on the main dictionary, or in the alternative the user dictionary, depending upon whether the text input is associated only with default spell checking in the former circumstance, or with user dictionary utilized spell checking in the latter circumstance.

Figure 1:
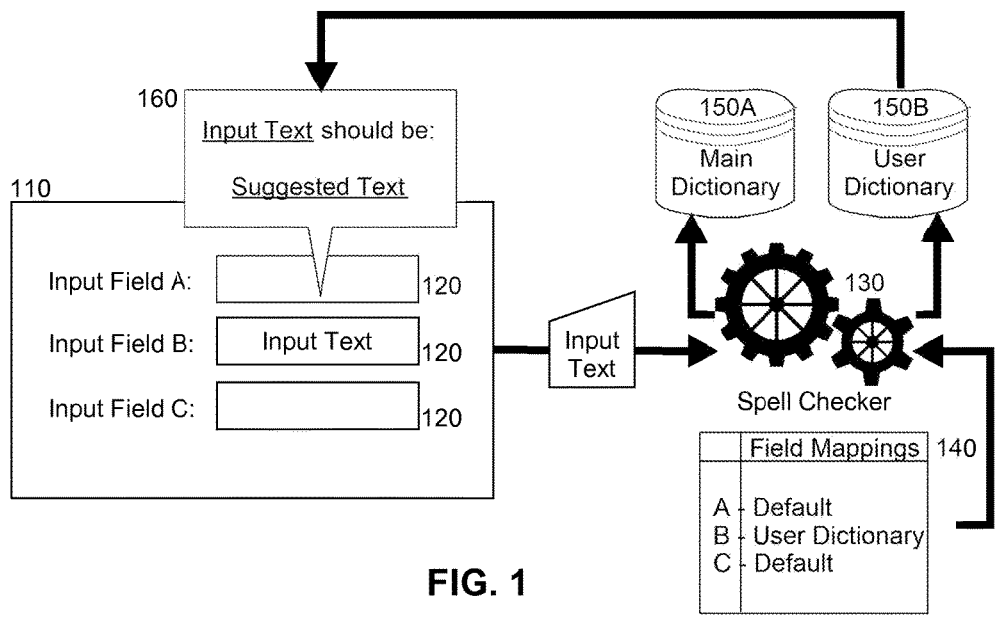
FIG. 1 is a pictorial illustration of a process for context sensitive user dictionary utilization in text input field spell checking.

In yet further illustration, FIG. 1 is a pictorial illustration of a process for context sensitive user dictionary utilization in text input field spell checking. As shown in FIG. 1, a user interface 110 to a computer program is presented. The user interface 110 includes different textual input fields 120 in which text input is received. Each of the textual input fields 120 is associated in mapping table 140 with either default spell checking or user dictionary spell checking. Thereafter, as input text is received in one of the textual input fields 120, spell checker 130 consults the mapping table 140 in order to determine whether or not the one of the textual input fields 120 is associated with default spell checking or user dictionary spell checking. In the former instance, the spell checker 130 utilizes only the main dictionary 150A in order to spell check the textual input. In the latter instance, the spell checker 130 additionally refers to the user dictionary 150B.

Of import, in the latter instance, the user dictionary 150B includes terms contextually relevant to the computer program, the user interface 110 or both. In this regard, the user dictionary 150B may include terms corresponding to the static text of the user interface 110, or terms corresponding to data in a database of the computer program. Consequently, whereas the main dictionary 150A may include general terms of a commercially published, topic neutral dictionary specific only to a particular spoken language, the user dictionary 150B may include terms that are contextually relevant only to the computer program and the data stored in connection therewith.

Notably, when spell checking textual input of one of the textual input fields 120 associated with user dictionary spell checking, the spell checker 130 may locate similarly spelled text in the user dictionary 150B and in consequence, the spell checker 130 may display a prompt 160 recommending a substitution of the textual input with the similarly spelled text. In fact, the spell checker 130 may do so even of the word or words of the textual input are determined to be spelled correctly based upon a comparison of the textual input to the content of the main dictionary 150A. Consequently, in reference to the similarly spelled text of the user dictionary 150B, the spell checker 130 can detect textual input that while technically correctly spelled, is contextual irrelevant based upon the identity of a corresponding one of the textual input fields 120 in which the textual input is received.

Figure 2:
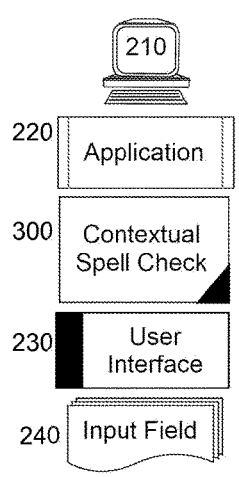
FIG. 2 is a schematic illustration of a data processing system configured for context sensitive user dictionary utilization in text input field spell checking; and, FIG. 3 is a flow chart illustrating a process for context sensitive user dictionary utilization in text input field spell checking.

The process described in connection with FIG. 1 is implemented in a data processing system. In further illustration, FIG. 2 schematically shows a data processing system configured for context sensitive user dictionary utilization in text input field spell checking. The system includes a host computing system 210 that includes one or more computers each with memory and at least one processor. A computer program 220 executes in the host computing system 210 in which textual input is received in one or more input fields 240 presented in a display of the host computing system 210 within a user interface 230 of the computer program 220.

A contextual spell check module 300 is coupled to the computer program 220. The contextual spell check module 300 includes program code enabled upon execution in the memory of the host computing system to receive textual input in a corresponding one of the input fields 240, to determine whether the corresponding one of the input fields 240 is mapped to default spell checking or user dictionary utilized spell checking, and to respond to a determination that the corresponding one of the input fields is associated with default spell checking, by performing spell checking using only a main dictionary, but otherwise by performing spell checking using both the main dictionary and also a user dictionary.

Figure 3:
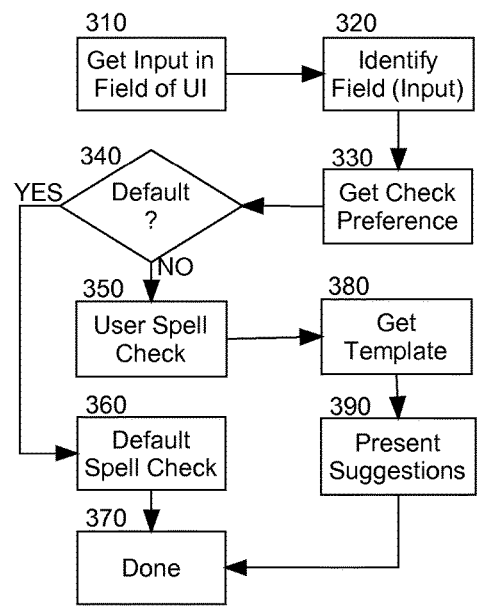

In even further illustration of the operation of the contextual spell check module 300, FIG. 3 is a flow chart illustrating a process for context sensitive user dictionary utilization in text input field spell checking. Beginning in block 310, textual input is received in a textual input field of a user interface to the computer program. In block 320, the textual input field is identified and in block 330, a spell check preference is determined for the identified textual input field. In decision block 340, if the spell check preference is determined to be default spell checking, in block 360 default spell checking is performed on the textual input and the process ends in block 370.

Notwithstanding, in decision block 340, if user dictionary utilized spell checking is determined for the textual input field, in block 350 user dictionary utilized spell checking is performed by determining, despite words in the textual input known to generally be spelled correct, whether or not the textual input is most relevant to the input field, or whether a similarly spelled word or set of words is appropriate. Optionally, in block 380 a template for the input field is loaded into memory and mappings between the textual input and other recommended substitute text are identified. Thereafter, in block 390 the substitute text of the template along with one or more other alternatives for the textual input determined from the user dictionary are presented in the user interface in connection with the input field and the textual input. Finally, in block 370 the process ends.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for context sensitive user dictionary utilization in text input field spell checking, the method comprising:
   associating in memory of a computer different text input fields of a user interface of a computer program with either default spell checking or user dictionary utilized spell checking;
   executing the computer program in the memory of the computer;
   receiving text input during the execution of the computer program in one of the different text input fields;
   determining whether the one of the different text input fields is associated in the memory with default spell checking or user dictionary utilized spell checking; and,
   responsive to a determination that the one of the different text input fields is associated in the memory with default spell checking, performing spell checking using only a main dictionary, but otherwise performing spell checking using both the main dictionary and also a user dictionary.

2. The method of claim 1, wherein the user dictionary comprises words present in a database of previously presented input by one or more end users in one or more of the different text input fields of the user interface.

3. The method of claim 1, wherein the user dictionary comprises words present in a database of static text presented in the user interface.

4. The method of claim 1, wherein the spell checking of the received text input, when the one of the different text input fields is associated in the memory with default spell checking, compares the received text to words in the main dictionary, fails to locate an identically spelled word in the main dictionary, and marks the received text input in the one of the different text input fields as a misspelled word.

5. The method of claim 1, wherein the spell checking of the received text input, when the one of the different text input fields is associated in the memory with user dictionary utilized spell checking, not only compares the received text input to words in the main dictionary and determines that the received text input is correctly spelled based upon the main dictionary, but also compares the received text input to a similarly spelled but different word in the user dictionary, and in response displays a recommended change in spelling of the received text input to the similarly spelled but different word in the user dictionary.

6. The method of claim 1, further comprising:
   additionally associating the one of the different text input fields with a template comprising correlated pairs of text input and suggested changes in spelling of the text input; and,
   responsive to the receipt of text input in the one of the different text input fields, determining whether or not the text input is present in the template and if the text input is present in the template, displaying in the user interface the suggested changes in spelling of the text input as specified by the template.

7. A data processing system configured for context sensitive user dictionary utilization in text input field spell checking, the system comprising:
   a host computing system comprising one or more computers each with memory and at least one processor;
   a computer program executing in the memory of the host computing system, the computer program presenting a user interface comprising different text input fields; and,
   a spell checker module coupled to the computer program, the module comprising program code enabled upon execution in the memory of the host computing system to create an association between each of the different text input fields and either default spell checking or user dictionary utilized spell checking, to receive text input during the execution of the computer program in one of the different text input fields, to determine whether the one of the different text input fields is associated in the memory with default spell checking or user dictionary utilized spell checking and to respond to a determination that the one of the different text input fields is associated in the memory with default spell checking, by performing spell checking using only a main dictionary, but otherwise by performing spell checking using both the main dictionary and also a user dictionary.

8. The system of claim 7, wherein the user dictionary comprises words present in a database of previously presented input by one or more end users in one or more of the different text input fields of the user interface.

9. The system of claim 7, wherein the user dictionary comprises words present in a database of static text presented in the user interface.

10. The system of claim 7, wherein the spell checking of the received text input, when the one of the different text input fields is associated in the memory with default spell checking, compares the received text to words in the main dictionary, fails to locate an identically spelled word in the main dictionary, and marks the received text input in the one of the different text input fields as a misspelled word.

11. The system of claim 7, wherein the spell checking of the received text input, when the one of the different text input fields is associated in the memory with user dictionary utilized spell checking, not only compares the received text input to words in the main dictionary and determines that the received text input is correctly spelled based upon the main dictionary, but also compares the received text input to a similarly spelled but different word in the user dictionary, and in response displays a recommended change in spelling of the received text input to the similarly spelled but different word in the user dictionary.

12. The system of claim 7, wherein the program code of the module further associates the one of the different text input fields with a template comprising correlated pairs of text input and suggested changes in spelling of the text input and responds to the receipt of text input in the one of the different text input fields, by determining whether or not the text input is present in the template and if the text input is present in the template, by displaying in the user interface the suggested changes in spelling of the text input as specified by the template.

13. A computer program product for context sensitive user dictionary utilization in text input field spell checking, the computer program product comprising a non-transitory computer readable storage medium having program instructions embodied therewith, the program instructions executable by a device to cause the device to perform a method comprising:
  associating in memory of a computer different text input fields of a user interface of a computer program with either default spell checking or user dictionary utilized spell checking;
  executing the computer program in the memory of the computer;
  receiving text input during the execution of the computer program in one of the different text input fields;
  determining whether the one of the different text input fields is associated in the memory with default spell checking or user dictionary utilized spell checking; and,
  responsive to a determination that the one of the different text input fields is associated in the memory with default spell checking, performing spell checking using only a main dictionary, but otherwise performing spell checking using both the main dictionary and also a user dictionary.

14. The computer program product of claim 13, wherein the user dictionary comprises words present in a database of previously presented input by one or more end users in one or more of the different text input fields of the user interface.

15. The computer program product of claim 13, wherein the user dictionary comprises words present in a database of static text presented in the user interface.

16. The computer program product of claim 13, wherein the spell checking of the received text input, when the one of the different text input fields is associated in the memory with default spell checking, compares the received text to words in the main dictionary, fails to locate an identically spelled word in the main dictionary, and marks the received text input in the one of the different text input fields as a misspelled word.

17. The computer program product of claim 13, wherein the spell checking of the received text input, when the one of the different text input fields is associated in the memory with user dictionary utilized spell checking, not only compares the received text input to words in the main dictionary and determines that the received text input is correctly spelled based upon the main dictionary, but also compares the received text input to a similarly spelled but different word in the user dictionary, and in response displays a recommended change in spelling of the received text input to the similarly spelled but different word in the user dictionary.

18. The computer program product of claim 13, wherein the method further includes:
  additionally associating the one of the different text input fields with a template comprising correlated pairs of text input and suggested changes in spelling of the text input; and,
  responsive to the receipt of text input in the one of the different text input fields, determining whether or not the text input is present in the template and if the text input is present in the template, displaying in the user interface the suggested changes in spelling of the text input as specified by the template.

* * * * *